United States Patent
Handel et al.

(10) Patent No.: US 7,801,760 B2
(45) Date of Patent: Sep. 21, 2010

(54) METHOD AND SYSTEM FOR CAPTURING AND CALCULATING COMPLEX CONSUMER RATINGS OF GOODS AND SERVICES

(75) Inventors: Sean Handel, Moss Beach, CA (US); Sriram Chakravarthy, San Jose, CA (US)

(73) Assignee: Rearden Commerce, Inc., Foster City, CA (US)

( * ) Notice: Subject to any disclaimer, the term of this patent is extended or adjusted under 35 U.S.C. 154(b) by 1287 days.

(21) Appl. No.: 11/240,739

(22) Filed: Sep. 30, 2005

(65) Prior Publication Data

US 2006/0190961 A1    Aug. 24, 2006

(51) Int. Cl.
G06F 17/30    (2006.01)
(52) U.S. Cl. .......................................... 705/10
(58) Field of Classification Search ...................... 705/7, 705/10
See application file for complete search history.

(56) References Cited

U.S. PATENT DOCUMENTS

| | | | |
|---|---|---|---|
| 5,253,166 A | 10/1993 | Dettelbach et al. | |
| 5,566,291 A * | 10/1996 | Boulton et al. | 715/709 |
| 5,832,451 A | 11/1998 | Flake et al. | |
| 5,893,091 A | 4/1999 | Hunt et al. | |
| 5,948,040 A | 9/1999 | DeLorme et al. | |
| 6,016,478 A | 1/2000 | Zhang et al. | |
| 6,023,679 A | 2/2000 | Acebo et al. | |
| 6,038,542 A | 3/2000 | Ruckdashei | |
| 6,041,305 A | 3/2000 | Sakurai | |
| 6,047,327 A | 4/2000 | Tso et al. | |
| 6,085,164 A | 7/2000 | Smith et al. | |
| 6,144,942 A | 11/2000 | Ruckdashei | |
| 6,295,521 B1 | 9/2001 | DeMarcken et al. | |
| 6,360,205 B1 | 3/2002 | Iyengar et al. | |
| 6,442,526 B1 | 8/2002 | Vance et al. | |
| 6,457,045 B1 | 9/2002 | Hanson et al. | |
| 6,529,136 B2 | 3/2003 | Cao et al. | |
| 6,631,363 B1 | 10/2003 | Brown et al. | |
| 6,640,230 B1 | 10/2003 | Alexander et al. | |
| 6,658,093 B1 | 12/2003 | Langseth et al. | |
| 6,788,946 B2 | 9/2004 | Winchell et al. | |
| 6,826,543 B1 | 11/2004 | Harford et al. | |
| 6,847,988 B2 | 1/2005 | Toyouchi et al. | |
| 6,993,503 B1 | 1/2006 | Heissenbuttel et al. | |
| 7,092,892 B1 | 8/2006 | Sobalvarro et al. | |
| 7,136,821 B1 | 11/2006 | Kohavi et al. | |
| 7,139,718 B2 | 11/2006 | Jeyachandran et al. | |
| 7,171,369 B1 | 1/2007 | Bertram et al. | |

(Continued)

OTHER PUBLICATIONS

Orttung, Mark et al., U.S. Appl. No. 10/960,408, entitled "Customer Satisfaction in Booking Process", filed Oct. 6, 2004.

(Continued)

*Primary Examiner*—Romain Jeanty
(74) *Attorney, Agent, or Firm*—Greenberg Traurig, LLP

(57) ABSTRACT

Method and system for capturing and calculating complex consumer ratings of goods and services, which in one embodiment comprises receiving from a user a request for a rating of goods or services; and presenting to the user a rating for the goods or services, the rating based on ratings provided by one or more reviewers having demographic features matching demographic features of the user.

20 Claims, 3 Drawing Sheets

U.S. PATENT DOCUMENTS

| | | |
|---|---|---|
| 7,251,633 B2 | 7/2007 | Ludtke et al. |
| 7,263,664 B1 | 8/2007 | Daughtery |
| 7,302,399 B1 | 11/2007 | Donovan et al. |
| 7,333,941 B1 | 2/2008 | Choi |
| 7,337,125 B2 | 2/2008 | Kraft et al. |
| 7,376,586 B1 | 5/2008 | Partovi et al |
| 7,433,832 B1 * | 10/2008 | Bezos et al. .................. 705/26 |
| 2001/0014867 A1 | 8/2001 | Conmy |
| 2001/0049637 A1 | 12/2001 | Tso |
| 2002/0026336 A1 | 2/2002 | Eizenburg et al. |
| 2002/0065688 A1 | 5/2002 | Charlton et al. |
| 2002/0069093 A1 | 6/2002 | Stanfield |
| 2002/0107728 A1 * | 8/2002 | Bailey et al. .................. 705/14 |
| 2002/0111845 A1 | 8/2002 | Chong |
| 2002/0151321 A1 | 10/2002 | Winchell et al. |
| 2002/0156659 A1 | 10/2002 | Walker et al. |
| 2002/0178034 A1 | 11/2002 | Gardner et al. |
| 2002/0178069 A1 | 11/2002 | Walker et al. |
| 2003/0046138 A1 * | 3/2003 | Cary et al. .................... 705/10 |
| 2003/0195811 A1 | 10/2003 | Hayes et al. |
| 2005/0033615 A1 | 2/2005 | Nguyen et al. |

OTHER PUBLICATIONS

Transaction History of U.S. Appl. No. 10/960,408, filed Oct. 6, 2004, entitled "Consumer Satisfaction in Booking Process."

* cited by examiner

METHOD AND SYSTEM FOR CAPTURING AND CALCULATING COMPLEX CONSUMER RATINGS OF GOODS AND SERVICES

The present application is related to "Platform for Multi-Service Procurement," application Ser. No. 11/067,537, filed on Feb. 24, 2005, which is incorporated herein in its entirety by reference.

BACKGROUND OF THE INVENTION

Today many web sites that offer travel services and many travel booking systems display ratings of accommodations and services, either by some professionals or by users. However, the user rating is typically an averaged rating compiled from all the user ratings submitted or collected. Such an average of user ratings may not be useful to a particular user because the demographics of a many users visiting a certain accommodation or using a certain service may be very dissimilar from those of a particular person looking at the reservation system. At best he can glean from the pricing an idea of the potential user demographics, but often there may not be enough information about the accommodation or service in question. For example, an executive who is accustomed to luxury travel may not be interested in a rough camp-out.

Some information may be available, such as whether the accommodation is a camp or a luxurious hotel, but the review and its rating is unconditional and an average of all ratings, hence not providing information about whether this is a suitable accommodation or service for someone of a specific interest and demographic group.

What is clearly needed is a system and method that, in addition to giving a general averaged rating of an accommodation or service, can provide information that is specific to the demographics the person making the reservation and therefore may give him or her more relevant information about the venue, accommodation, services, goods, etc. subject to inquiry.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
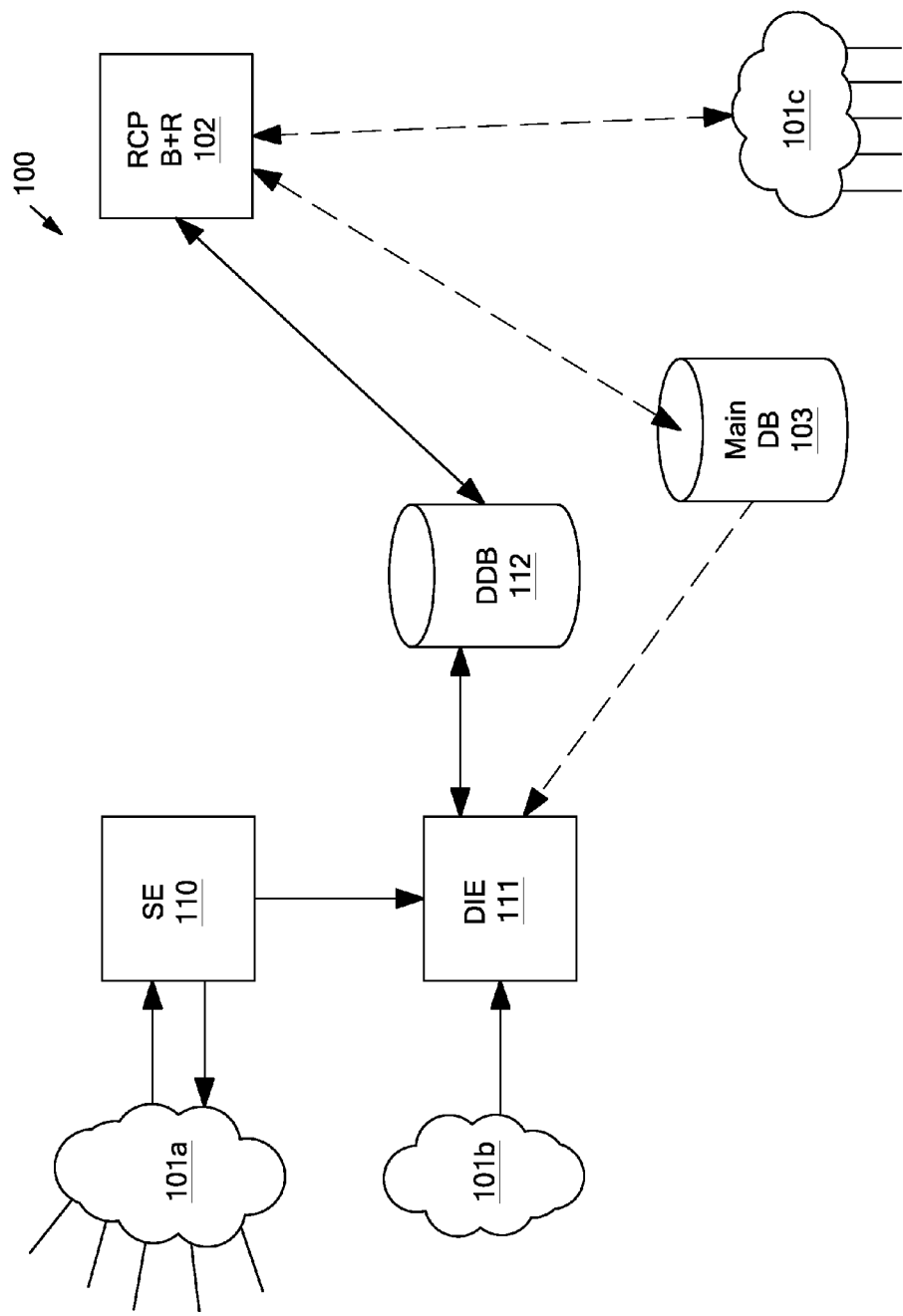
FIG. 1 shows the architecture 100 of an exemplary embodiment in accordance with one embodiment.

FIG. 1 shows the architecture 100 of an exemplary embodiment of the novel art of this disclosure. Survey engine 110 obtains information from users through a network such as, for example, network 101a (typically the Internet). A demographic information engine 111 processes all this information to generate demographic views of various accommodations and services. Engine 111 may also import additional information from other sources, for example, network 101b (may be also the Internet or a private network). The demographic views generated by the demographic information engine 111 are then extracted and stored in a demographic database 112. Said engine 111 may also be linked to a main database 103 that is used for a standard booking and reservation system 102, such as a commerce platform. Booking and reservation system 102 then provides services to many clients through a network 101c, such as the Internet. More details about the commerce platform are disclosed in co-pending applications, referenced above.

Figure 2:
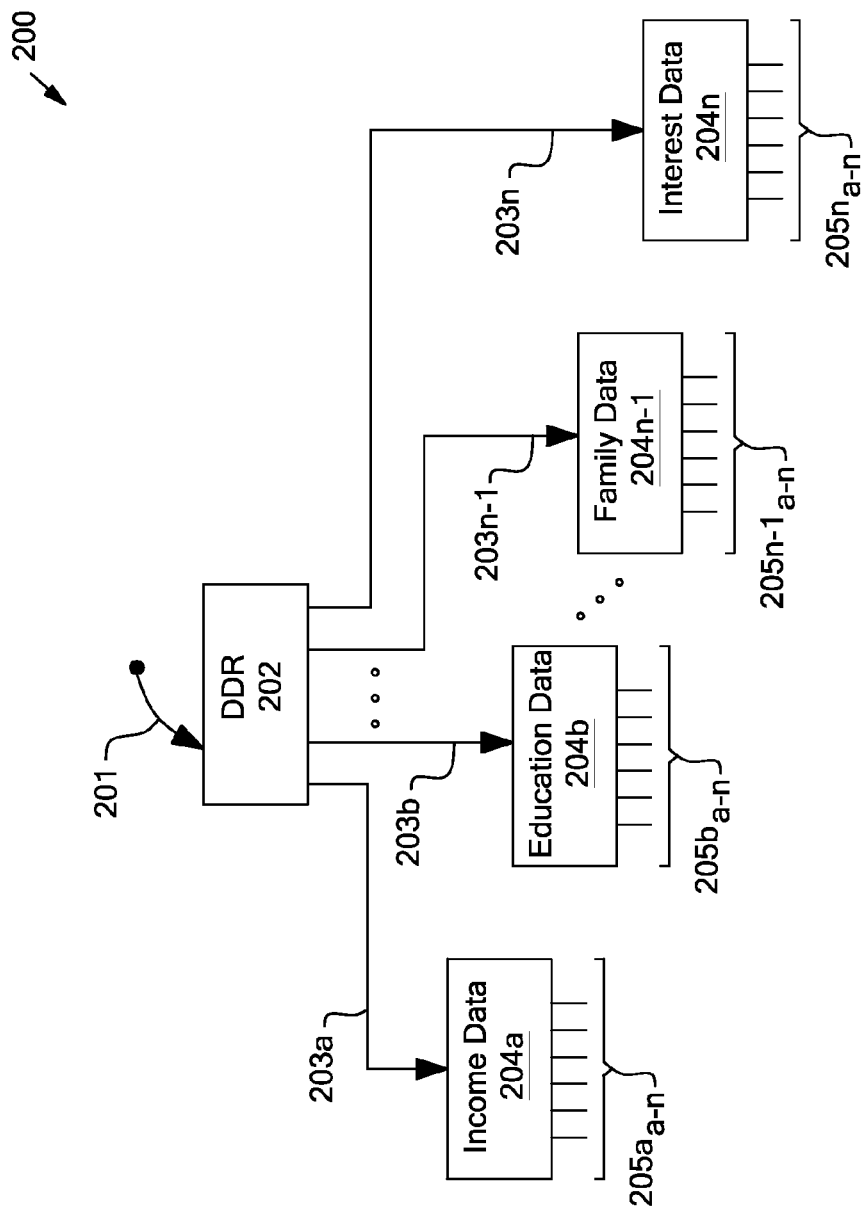
FIG. 2 shows an organization of the demographic views that could be stored in a database in accordance with one embodiment.

FIG. 2 shows an organization 200 of the demographic views that could be stored in database 112 or any other suitable storage location (not shown). Root pointer 201 points to a demographic data root 202 that may have various categories 203 a-n, such as income data, education data, family data, personal interest data, etc. These categories 203 a-n could also include categories such as religion, outlook on life, sexual orientation—whatever criteria may be used to define a specific demographic category. Inside each category, such as category 204a, there may be a whole subset of specific information, indicated as 205 a-n, which describes the various options a user may select, for example, in a survey, and which is presented as a result.

Figure 3:
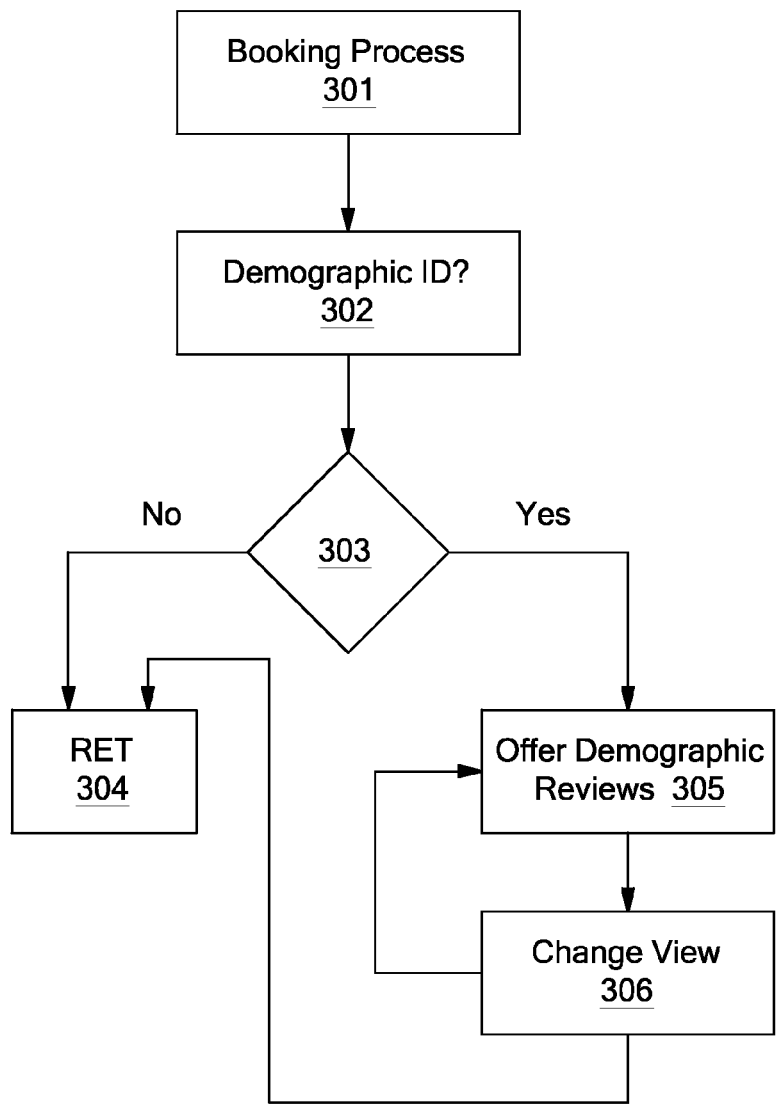
FIG. 3 shows a flow diagram describing the process in accordance with one embodiment.

FIG. 3 shows the process 300 that is set in motion when a user makes a reservation. After the standard booking or selection process in step 301, the user's demographic ID is checked in step 302. This demographic ID may be used to protect demographic data. In cases where a demographic ID is required, only users who have supplied their own demographic data and have been positively identified (not anonymous) are given access to demographic data that pertains to their own demographic group. Thus at step 303, if the user does not supply a demographic ID ("no"), demographic details are omitted and only averaged data are reported to the user as part of a resumed booking process in step 304. If a user has supplied a demographic ID and demographic data ("yes"), the user then moves to step 305, in which he is allowed to review the offer for the selected goods or services with specific demographic rating data plus the averaged rating data, allowing him to discern the differences between the rating given by members of his own demographic group for this accommodation or service and ratings of the general averaged data. The user may then, in step 306, change his selected demographic views and return to step 305. That is, because his profile is complex, as described above in the discussion of FIG. 2, he may put different weight on different aspects of his demographics and thus receive different data results, accordingly. This loop may be repeated several times, until the user feels he has a satisfactory amount of information, and then the normal booking process is resumed at step 304.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

What is claimed is:

1. A method comprising:
   receiving, via computing device, from a user a request for a rating of goods or services;
   presenting, via the computing device, to the user a rating for the goods or services, the rating based on ratings provided by one or more reviewers having demographic features matching demographic features of the user; and
   presenting an option to the user to change the demographic features of the user, wherein the changed demographic features of the user are used to match the demographic features of the reviewers in determining the rating, and wherein a pre-selected weight is assigned to each of the demographic features of the user to allow emphasis of at least a first demographic feature over at least a second demographic feature in matching the demographic features of the reviewers;
   wherein the demographic data of the user is to be provided separately from the request for the rating of the goods and services, and a demographic ID corresponding to the user is to be submitted with the request for the rating of the goods and services, wherein the demographic ID is used to match demographic features of the user with demographic features of the one or more reviewers.

2. The method of claim 1, further comprising, in response to not having previously obtained demographic data related to the user, presenting to the user one or more ratings for the goods or services exclusive of considering demographic features of the user or the reviewers.

3. The method of claim 2, wherein the demographic data of the user is to be provided separately from the request for the rating of the goods and services, and a demographic ID corresponding to the user is to be submitted with the request for the rating of the goods and services and the demographic ID is used to match demographic features of the user with demographic features of the one or more reviewers.

4. The method of claim 2, further comprising, in response to not having previously obtained demographic data related to the user, presenting to the user an average rating of the goods or services.

5. The method of claim 1, wherein the matching of the demographic features of the user and the demographic features of one or more reviewers is to be based on a predetermined criteria.

6. The method of claim 1, further comprising presenting to the user one or more a ratings for the goods or services exclusive of considering demographic features of the user or the reviewers.

7. The method of claim 1, further comprising presenting to the user a rating of the goods or services comprising of an average of ratings for the goods or services as previously provided by reviewers.

8. The method of claim 1, further comprising presenting an option to the user to change the pre-selected weights on the demographic features.

9. The method of claim 8, wherein at least one of the reviewers having demographic features matching the demographic features of the user is different in response to a change in the pre-selected weights on the demographic features of the user.

10. The method of claim 1, wherein the demographic features comprise one or more of income data, education data, family data, and personal interest data.

11. A tangible machine readable medium having stored thereon a set of instructions which when executed by a computer perform a method comprising:
    receiving from a user a request for a rating of goods or services;
    presenting to the user a rating for the goods or services, the rating based on ratings provided by one or more reviewers having demographic features matching demographic features of the user; and
    presenting an option to the user to change the demographic features of the user, wherein the changed demographic features of the user are used to match the demographic features of the reviewers in determining the rating, and wherein a pre-selected weight is assigned to each of the demographic features of the user to allow emphasis of at least a first demographic feature over at least a second demographic feature in matching the demographic features of the reviewers;
    wherein the demographic data of the user is to be provided separately from the request for the rating of the goods and services, and a demographic ID corresponding to the user is to be submitted with the request for the rating of the goods and services, wherein the demographic ID is used to match demographic features of the user with demographic features of the one or more reviewers.

12. The machine readable medium of claim 11, further comprising, in response to not having previously obtained demographic data related to the user, presenting to the user one or more a ratings for the goods or services exclusive of considering demographic features of the user or the reviewers.

13. The machine readable medium of claim 12, further comprising, in response to not having previously obtained demographic data related to the user, presenting to the user an average rating of the goods or services.

14. The machine readable medium of claim 12, wherein the demographic data of the user is to be provided separately from the request for the rating of the goods and services, and a demographic ID corresponding to the user is to be submitted with the request for the rating of the goods and services and the demographic ID is used to match demographic features of the user with demographic features of the one or more reviewers.

15. The machine readable medium of claim 11, wherein the matching of the demographic features of the user and the demographic features of one or more reviewers is to be based on a predetermined criteria.

16. A system comprising:

at least one computing device for:

receiving from a user a request for a rating of goods or services; and presenting to the user a rating for the goods or services, the rating based on ratings provided by one or more reviewers having demographic features matching demographic features of the user; and presenting an option to the user to change the demographic features of the user, wherein the changed demographic features of the user are used to match the demographic features of the reviewers in determining the rating, and wherein a pre-selected weight is assigned to each of the demographic features of the user to allow emphasis of at least a first demographic feature over at least a second demographic feature in matching the demographic features of the reviewers;

wherein the demographic data of the user is to be provided separately from the request for the rating of the goods and services, and a demographic ID corresponding to the user is to be submitted with the request for the rating of the goods and services, wherein the demographic ID is used to match demographic features of the user with demographic features of the one or more reviewers.

17. The system of claim 16, further comprising presenting to the user one or more ratings for the goods or services exclusive of considering demographic features of the user or the reviewers, in response to not having previously obtained demographic data related to the user.

18. The system of claim 17, further comprising, presenting to the user an average rating of the goods or services, in response to not having previously obtained demographic data related to the user.

19. The system of claim 17, wherein the demographic data of the user is to be provided separately from the request for the rating of the goods and services, and a demographic ID corresponding to the user is to be submitted with the request for the rating of the goods and services and the demographic ID is to be used to match demographic features of the user with demographic features of the one or more reviewers.

20. The system of claim 16, wherein the matching of the demographic features of the user and the demographic features of one or more reviewers is to be based on a predetermined criteria.

* * * * *